(No Model.)
W. W. LEACH.
TREE CULTIVATOR.
No. 475,124. Patented May 17, 1892.
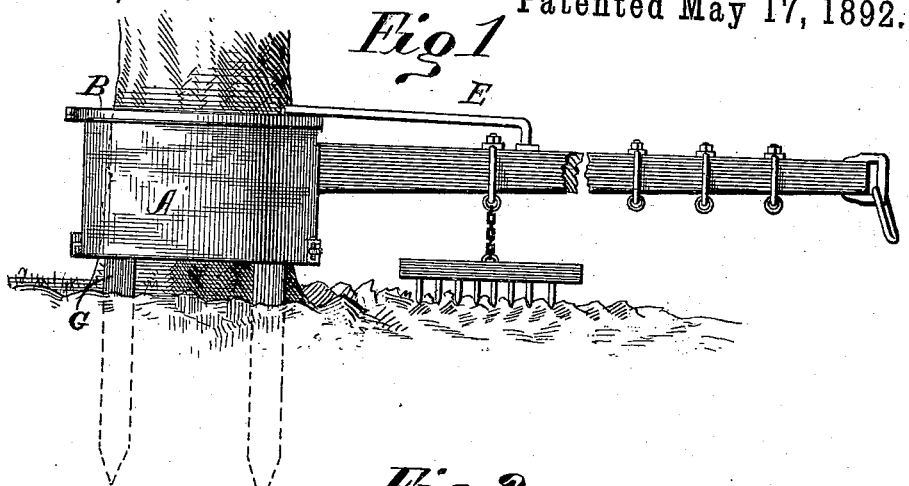
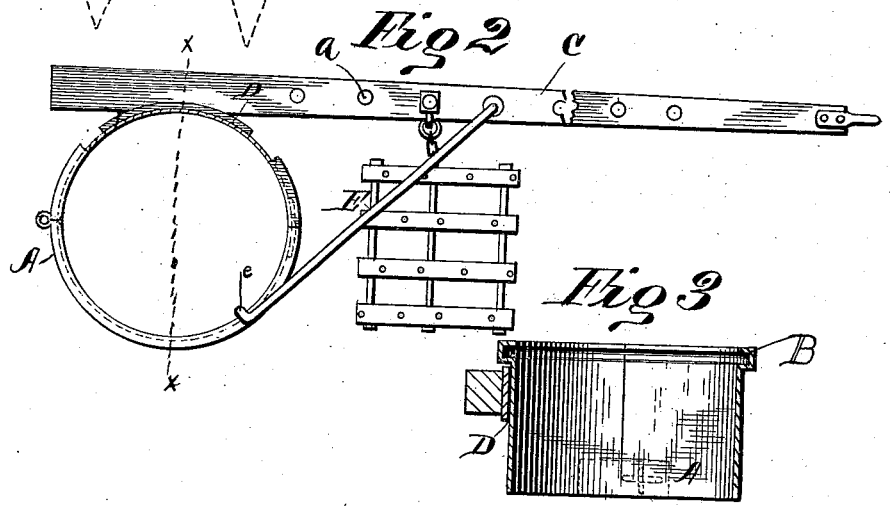
Witnesses
C. C. Burden
C. S. Frye
William W. Leach,
Inventor:
By W. F. FitzGerald & Co.,
Attorneys

UNITED STATES PATENT OFFICE.

WILLIAM W. LEACH, OF SPRINGTOWN, ARKANSAS.

TREE-CULTIVATOR.

SPECIFICATION forming part of Letters Patent No. 475,124, dated May 17, 1892.

Application filed October 27, 1891. Serial No. 409,996. (No model.)

*To all whom it may concern:*

Be it known that I, WILLIAM W. LEACH, a citizen of the United States, residing at Springtown, in the county of Benton and State of Arkansas, have invented certain new and useful Improvements in Tree-Cultivators; and I do hereby declare the following to be a full, clear, and exact description of the invention, such as will enable others skilled in the art to which it appertains to make and use the same.

My invention has relation to improvements in tree-cultivators or cultivators for tilling the soil around and adjacent to the trunks of trees; and it consists in the construction, certain novel combinations, and the adaptation of parts hereinafter described, and particularly pointed out in the claims appended.

In the accompanying drawings, Figure 1 is a side elevation of my improved cultivator in its operative position. Fig. 2 is a plan view of the same, the sectional collar being partly in section. Fig. 3 is a vertical diametrical section taken in the plane indicated by the line $x$ $x$ on Fig. 2. Fig. 4 is a perspective view of the sweep, and Fig. 5 is a perspective view of the link-arm.

In the said drawings similar letters designate corresponding parts throughout the several views, referring to which—

A indicates the collar of my improved cultivator, which is preferably of a circular form in cross-section and comprises the two hinged sections, the free ends of which may be detachably connected in any approved manner, whereby the collar may be readily clasped about a tree. Suitably connected to and depending from the collar A are stakes G, which are designed and adapted to fix the collar with respect to the ground and tree, so as to thoroughly protect the latter, as presently disclosed.

Preferably formed integral with the upper edge of the sectional collar A is a flange B, which is preferably of a rectangular form in cross-section, as better shown in Fig. 3, and is designed for a purpose presently described.

C indicates the sweep of my improved cultivator, which is designed and adapted to move around the collar and tree, and is provided at intervals in its length with apertures $a$ for the passage of a clevis-bolt, through the medium of which a cultivator or the like is connected to the sweep.

By the provision of the apertures $a$ at intervals in the length of the sweep C it will be readily perceived that the cultivator or the like may be readily connected to said sweep so as to travel in circles at various distances from the tree around which the collar A is fixed.

Fixedly connected to the sweep C, adjacent to the inner end of the same, and engaging the surface of the collar A, is a curvilinear shoe D, which is designed and adapted to move around said collar when the sweep is set in motion.

Pivotally connected at one end to the sweep C, at an intermediate point in the length thereof, is a link-arm E, which is provided at its opposite end with the angular hook $e$, which is designed and adapted to engage and move in the rectangular flange B and hold the sweep to the collar.

In operation the sectional collar A is first clasped about a tree and the stakes G are then driven in the ground to fix said collar with respect to the tree, after which the sweep is connected to the collar by the link-arm E. The said sweep being then set in motion, the curvilinear shoe will move around the collar and the hook $e$ of the link-arm E will move in the flange B of the said collar and serve to hold the sweep thereto.

Having thus described my invention, what I claim, and desire to secure by Letters Patent, is—

1. In a tree-cultivator, substantially as described, the combination, with a collar adapted to be clasped about a tree and having a rectangular flange, and a suitable means for fixing said collar with respect to the tree, of a sweep carrying a shoe at its inner end bearing against the collar, a link-arm pivotally connected to the sweep and having an angular hook adapted to engage the flange of the collar, and a cultivator connected to the sweep, substantially as and for the purpose set forth.

2. In a tree-cultivator, the combination, with a collar adapted to be clasped about the trunk of a tree and having a rectangular flange at its upper edge, and stakes connected to the collar and adapted to take into the ground to fix said collar with respect to the tree, of a sweep, a shoe connected to the inner end of the sweep and bearing against the fixed collar, a link-arm connected at one end to the sweep and having a hook at its opposite end in engagement with the flange of the shield or collar, and a cultivator connected to the sweep, substantially as specified.

In testimony whereof I affix my signature in presence of two witnesses.

WILLIAM W. LEACH.

Witnesses:
 A. S. HULS,
 P. F. HALL.